US007745761B2

(12) United States Patent
Chen et al.

(10) Patent No.: US 7,745,761 B2
(45) Date of Patent: Jun. 29, 2010

(54) HOT-MELTING MACHINE WITH ROTATABLE WORKTABLE

(75) Inventors: Shun-Ho Chen, Tu-Cheng (TW); Li-Pei Huang, Chu-Nan (TW); Tzyy-Chyi Tsai, Tu-Cheng (TW); Yun-Hsiang Chuang, Chu-Nan (TW); Chuan-Xiong Tu, Shenzhen (CN); Chin-Hsien Tsai, Shindian (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW); Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 811 days.

(21) Appl. No.: 11/636,318

(22) Filed: Dec. 8, 2006

(65) Prior Publication Data
US 2008/0023148 A1 Jan. 31, 2008

(30) Foreign Application Priority Data
Jul. 26, 2006 (CN) .................. 2006 1 0061814

(51) Int. Cl.
*B29C 65/02* (2006.01)
*B29C 65/18* (2006.01)
*F25B 29/00* (2006.01)
*B32B 37/00* (2006.01)
*B32B 41/00* (2006.01)

(52) U.S. Cl. .................. 219/388; 219/243; 165/65; 156/358; 156/359; 156/344; 156/583.1

(58) Field of Classification Search .................. None
See application file for complete search history.

(56) References Cited
U.S. PATENT DOCUMENTS
2,694,131 A * 11/1954 Carson .................. 219/215
3,355,876 A * 12/1967 Oettinger et al. .............. 59/22

(Continued)

FOREIGN PATENT DOCUMENTS
JP        51041059 A   *  4/1976

(Continued)

*Primary Examiner*—Joseph M Pelham
(74) *Attorney, Agent, or Firm*—Jeffrey T. Knapp

(57) ABSTRACT

An exemplary hot-melting machine (20) includes a worktable (23), a number of carriers (24), a heater (25), at least one cooler (26), and a controller (28). The carriers are located on the worktable and are uniformly spaced apart. Each carrier is configured for holding a workpiece. The heater is configured for heating the workpiece. The cooler is configured for cooling the workpiece. The controller is configured for driving the worktable to rotate, the heater to move down toward and up away from a corresponding one of the carriers, and the at least one cooler to move down toward and up away from another corresponding one of the carriers. At each of successive stages in operation of the hot-melting machine, one of the carriers is aligned with the heater, another one the carriers is aligned with the at least one cooler, and a further one of the carriers is positioned such that a workpiece can be unloaded from the further one of the carriers and another workpiece can be loaded on the further one of the carriers.

14 Claims, 8 Drawing Sheets

U.S. PATENT DOCUMENTS

| | | | |
|---|---|---|---|
| 3,991,927 A * | 11/1976 | Napor et al. | 228/41 |
| 6,146,134 A * | 11/2000 | Kresak et al. | 432/121 |
| 7,290,591 B1 * | 11/2007 | Chen et al. | 164/348 |
| 7,357,288 B2 * | 4/2008 | Hosotani et al. | 228/6.2 |
| 2002/0047003 A1 * | 4/2002 | Bedingham et al. | 219/388 |

FOREIGN PATENT DOCUMENTS

| | | | |
|---|---|---|---|
| JP | 10278106 A | * | 10/1998 |
| KR | 704614 B1 | * | 4/2007 |
| TW | 360136 | | 6/1999 |

* cited by examiner

HOT-MELTING MACHINE WITH ROTATABLE WORKTABLE

CROSS-REFERENCE TO RELATED APPLICATION

This application is related to two co-pending U.S. patent application Ser. Nos. 11/636,319 and 11/636,317, entitled "COOLING MOLD WITH GAS GROOVES" and "HOT-MELTING METHOD WITH SIMULTANEOUS HEATING AND COOLING OF WORKPIECES" respectively. Such applications have the same assignee as the instant application and have been concurrently filed herewith. The disclosure of the above identified applications is incorporated herein by reference.

TECHNICAL FIELD

The present invention generally relates to hot-melting machines used for bonding workpieces together, and particularly to a hot-melting machine that includes both a heater and a cooler that can operate simultaneously.

BACKGROUND

With ongoing development in manufacturing technologies, hot-melting machines are now in widespread use in many industries. A hot-melting machine is configured for heating two or more workpieces affixed with hot-melting adhesive therebetween, in order to produce a whole workpiece unit.

Referring to FIG. 6, a typical hot-melting machine 10 is shown. The hot-melting machine 10 includes a worktable 11, and a controller 12 supported on the worktable 11. The worktable 11 includes a raised support platform 13. A heater 14 and a cooler 15 are disposed on the support platform 13, and protrude below the support platform 13. The heater 14 includes a first driving mechanism 141, and a heating board 142 disposed at a bottom end of the first driving mechanism 141 beneath the support platform 13. The cooler 15 includes a second driving mechanism 151, and a cooling mold 152 disposed at a bottom end of the second driving mechanism 152 beneath the support platform 13. A guide rail 16 is disposed on the worktable 11 under the support platform 13. The worktable 11 further includes a carrier 17 and a carrier driving mechanism 18. The carrier driving mechanism 18 is configured for driving the carrier 17 to slide along the guide rail 16. The controller 12 is configured for driving the heater 14, the cooler 15, and the carrier driving mechanism 18 to move.

Referring to FIG. 7, the cooling mold 152 is substantially rectangular. The cooling mold 152 includes a projecting portion 1521. A recessed cooling portion 1522 is formed in the projecting portion 1521 according to a desired shape of a workpiece unit. A plurality of through holes 1523 are defined in a top of the cooling portion 1522. The through holes 1523 run through the cooling mold 152.

Referring also to FIG. 8, in use, a workpiece is affixed to another workpiece by a hot-melting adhesive, in order to form a workpiece unit. The workpiece unit is loaded on the carrier 17. The carrier driving mechanism 18 drives the carrier 17 to move along the guide rail 16 under control of the controller 12, until the workpiece unit aligns with the heater 14. The first driving mechanism 141 drives the heating board 142 to move down toward the workpiece unit under control of the controller 12, until the heating board 142 abuts against the workpiece unit for heating. When a heating process for the workpiece unit is finished, the first driving mechanism 141 drives the heating board 142 to move up and separate from the workpiece unit and return to its original position. The carrier driving mechanism 18 drives the carrier 17 to move along the guide rail 16 until the workpiece unit aligns with the cooler 15. The second driving mechanism 151 drives the cooling mold 152 to move down toward the workpiece unit under control of the controller 12, until the cooling mold 152 abuts against the workpiece unit for cooling. Gas provided by a gas-compressor is injected into the cooling mold 152 via the through holes 1523 to cool the workpiece unit. When a cooling process for the workpiece unit is finished, the second driving mechanism 151 drives the cooling mold 152 to return to its original position. The carrier driving mechanism 18 drives the carrier 17 to move back along the guide rail 16 to return to its original position. Finally, the workpiece unit is unloaded from the carrier 17.

In the hot-melting machine 10, the heater 14 and the cooler 15 do not run simultaneously. Therefore the efficiency of processing of workpiece units is limited.

Thus a new hot-melting machine is desired in order to overcome the above-described shortcomings.

SUMMARY

A hot-melting machine includes a worktable, a number of carriers, a heater, at least one cooler, and a controller. The carriers are located on the worktable and are uniformly spaced apart. Each carrier is configured for holding a workpiece. The heater is configured for heating the workpiece. The cooler is configured for cooling the workpiece. The controller is configured for driving the worktable to rotate, the heater to move down toward and up away from a corresponding one of the carriers, and the at least one cooler to move down toward and up away from another corresponding one of the carriers. At each of successive stages in operation of the hot-melting machine, one of the carriers is aligned with the heater, another one the carriers is aligned with the at least one cooler, and a further one of the carriers is positioned such that a workpiece can be unloaded from the further one of the carriers and another workpiece can be loaded on the further one of the carriers.

Other novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present hot-melting machine. Moreover, in the drawings, like reference numerals designate corresponding parts throughout the several views.

DETAILED DESCRIPTION OF THE EMBODIMENTS

Figure 1:
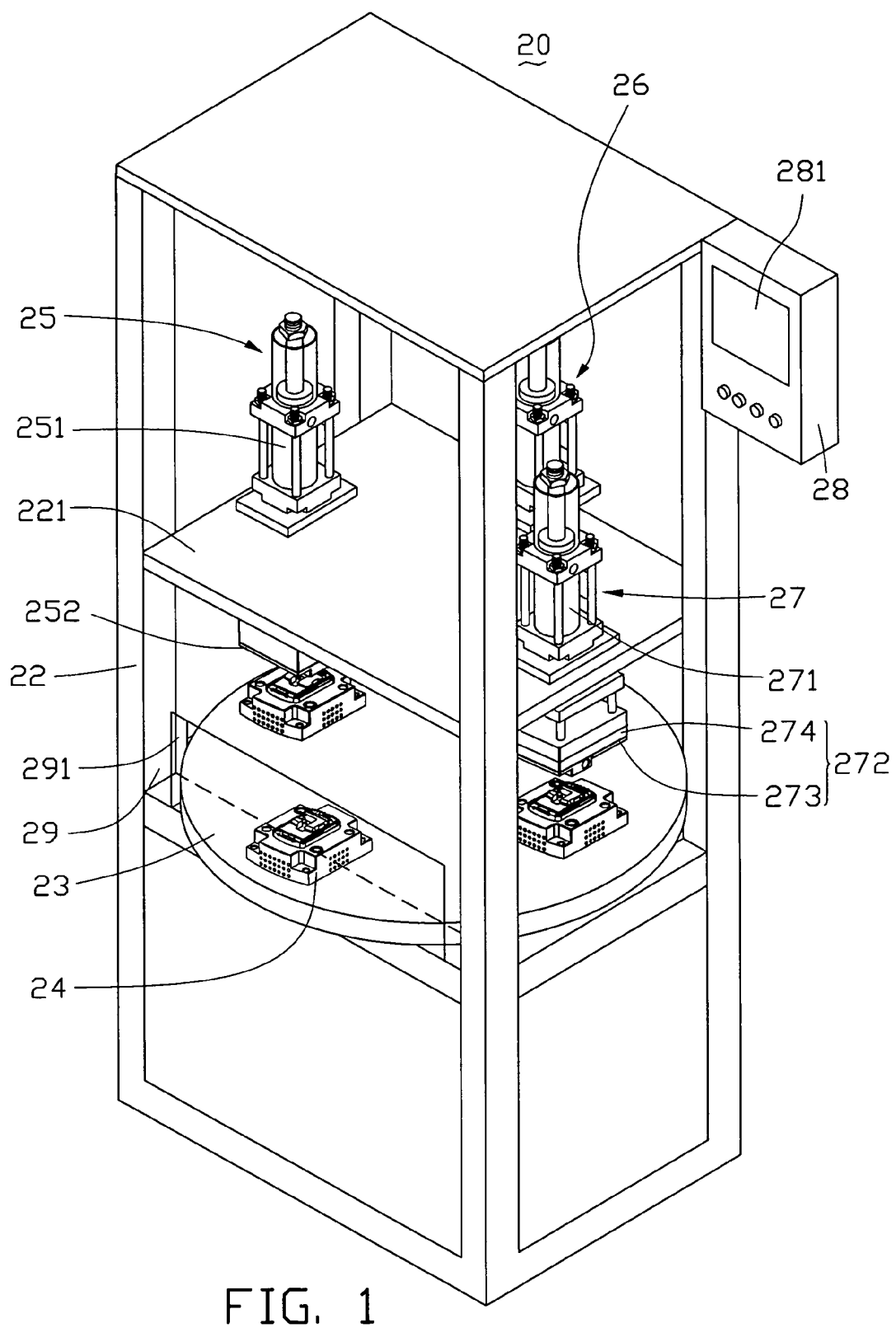
FIG. 1 is an isometric view of a hot-melting machine in accordance with a preferred embodiment of the present invention.

Referring to the drawings in detail, FIG. 1 shows a hot-melting machine in accordance with a preferred embodiment. The hot-melting machine 20 includes a frame 22, a worktable 23, at least three carriers 24, a heater 25, a first cooler 26, a second cooler 27, and a controller 28. In the illustrated embodiment, there are four carriers 24, which are disposed on the worktable 23.

The frame 22 includes a support platform 221. The support platform 221 is substantially rectangular, and is configured for supporting the heater 25, the first cooler 26, and the second cooler 27.

The worktable 23 is substantially a round board. The worktable 23 is rotatably disposed in the frame 22 beneath the support platform 221.

The carriers 24 are located on a periphery of the worktable 23, and are uniformly spaced apart. The carriers 24 include a first carrier (not labeled), a second carrier (not labeled), a third carrier (not labeled), and a fourth carrier (not labeled), arranged in that order in a counterclockwise direction. Each carrier 24 is configured for holding a workpiece unit (not shown). A shape of each carrier 24 corresponds to that of the workpiece unit.

Figure 2:
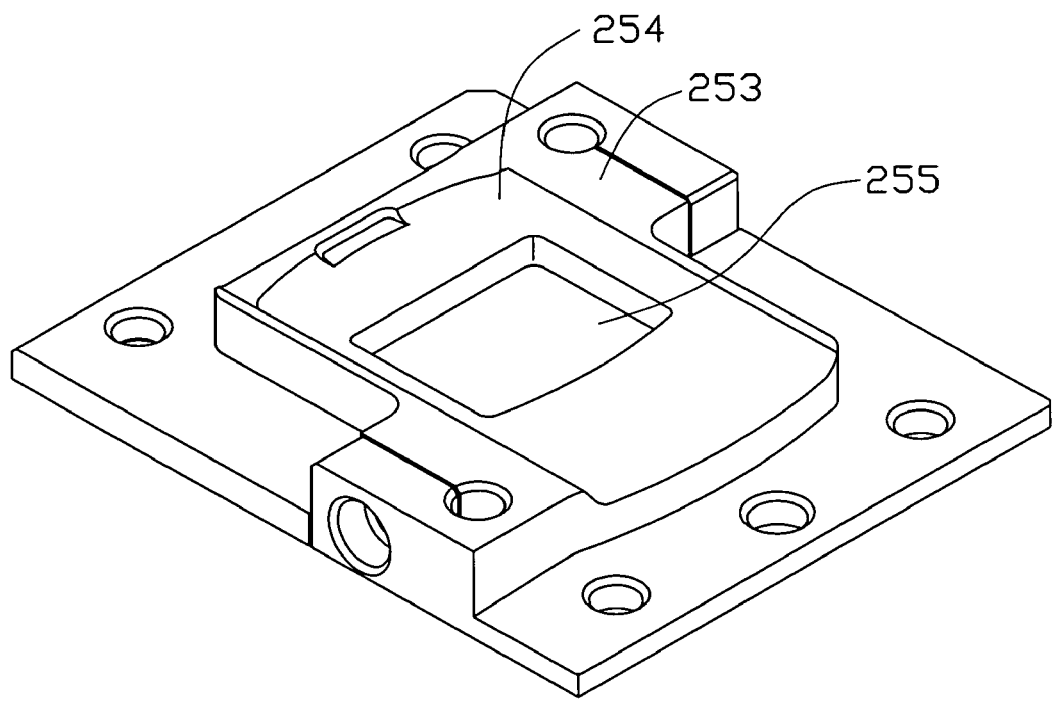
FIG. 2 is an enlarged, inverted isometric view of a heating board of a heater of the hot-melting machine of FIG. 1.

Referring also to FIG. 2, the heater 25 is attached to the support platform 221 of the frame 22. The heater 25 includes a first driving mechanism 251, and a heating board 252 disposed at a bottom end of the first driving mechanism 251 beneath the support platform 221. The first driving mechanism 251 is configured for driving the heating board 252 to move down and up. The heating board 252 includes a protrusion 253. A recessed heating portion 254 is formed in the protrusion 253. The heating portion 254 has a shape corresponding to a shape of the workpiece unit. The heating board 252 further includes a recess 255 defined in a top of the heating portion 254. In an alternative embodiment, the recess 255 of the heater 25 can be omitted.

Figure 3:
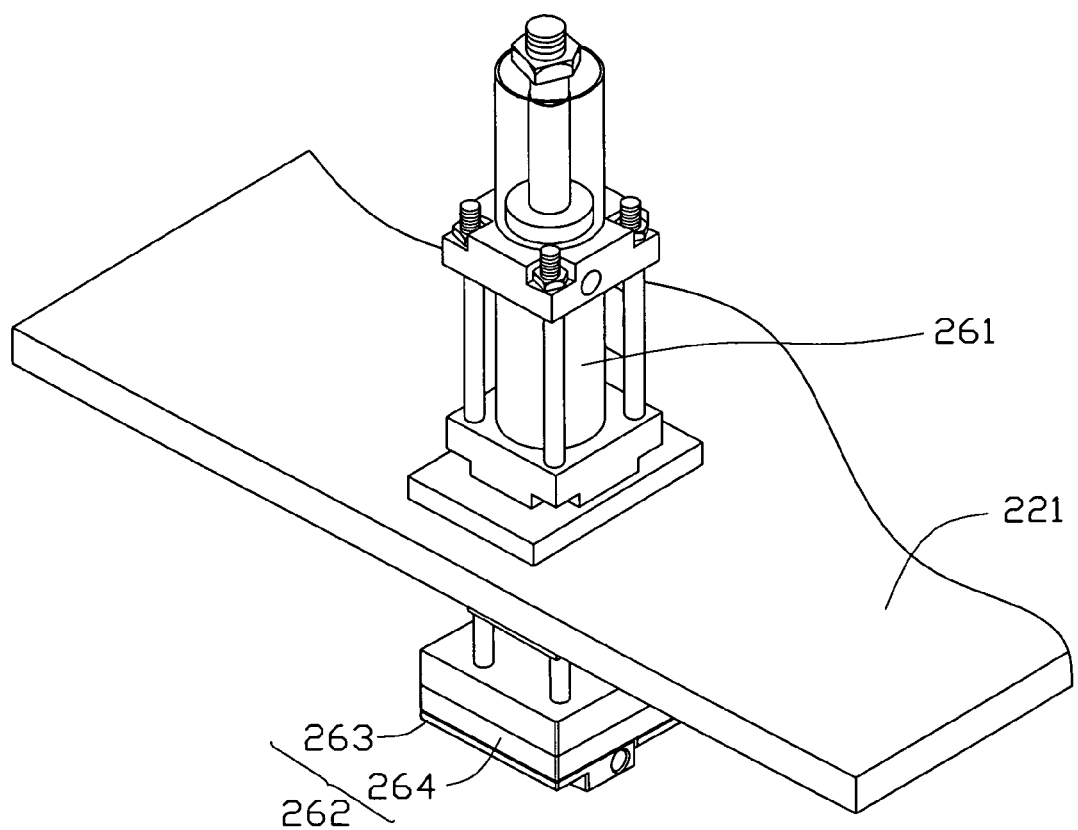
FIG. 3 is an enlarged, isometric view of one of coolers of the hot-melting machine of FIG. 1.
Figure 4:
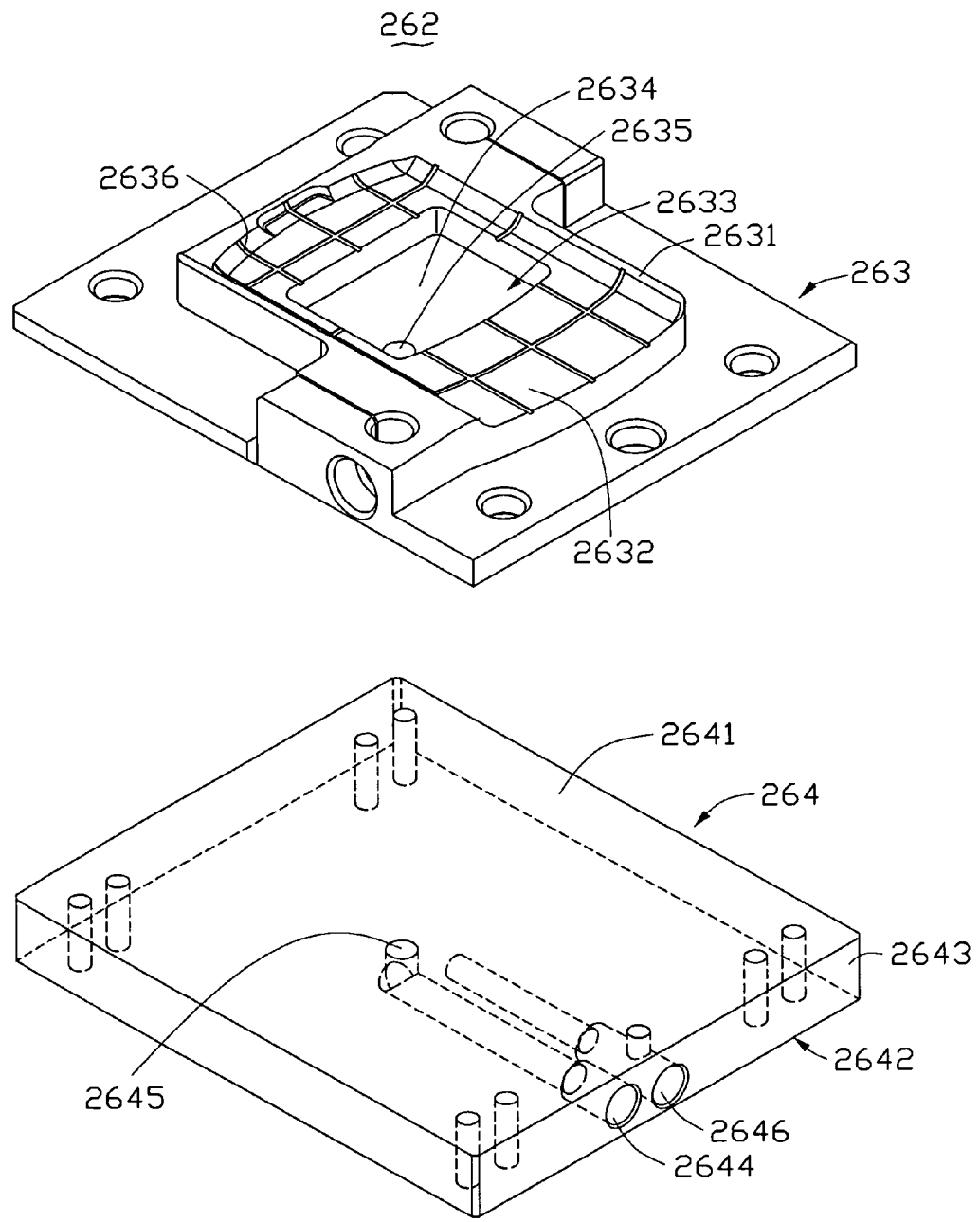
FIG. 4 is an enlarged, exploded, inverted isometric view of a cooling mold of the cooler of FIG. 3.

Referring also to FIGS. 3 and 4, the first cooler 26 is attached to the support platform 221 of the frame 22. The first cooler 26 includes a second driving mechanism 261, and a first cooling mold 262 disposed at a bottom end of the second driving mechanism 261 beneath the support platform 221. The second driving mechanism 261 is configured for driving the first cooling mold 262 to move down and up. The first cooling mold 262 includes a cooling board 263 and a securing board 264. The securing board 264 connects the cooling board 263 to the second driving mechanism 261.

The cooling board 263 is generally rectangular, and includes a protrusion 2631. A recessed cooling portion 2632 is formed in the protrusion 2631. The cooling portion 2632 has a shape corresponding to the shape of the workpiece unit. The cooling board 263 further includes a recess 2633 defined in a top of the cooling portion 2632. The recess 2633 has a top surface 2634. In these respects, the cooling board 263 is similar to the heating board 252 described above. However, the cooling board 263 includes at least one exit hole 2635 defined at the top surface 2634 of the recess 2633. The exit hole 2635 runs through the cooling board 263. In the illustrated embodiment, there is only a single exit hole 2635. The cooling portion 2632 further includes a plurality of intersecting grooves 2636 defined in the top and sides thereof. At least one of the grooves 2636 communicates with the recess 2633.

The securing board 264 is substantially rectangular, and is configured for engaging with the cooling board 263. The securing board 264 includes a lower surface 2641, an upper surface 2642 opposite to the lower surface 2641, and four side surfaces 2643 interconnecting the lower surface 2641 and the upper surface 2642. The lower surface 2641 of the securing board 264 is adjacent to the cooling board 263. The securing board 264 includes an entrance hole 2644 defined at one of the side surfaces 2643. The entrance hole 2644 is bent, and an inner portion thereof defines a transfer hole 2645 that is exposed at the lower surface 2641. When the securing board 264 is engaged with the cooling board 263, the transfer hole 2645 communicates with the exit hole 2635. The entrance hole 2644, and the exit hole 2635 cooperatively define an input channel (not labeled) communicating with the grooves 2636, for passage of gas that is injected into the first cooling mold 262 via the entrance hole 2644 of the securing board 264. The securing board 264 further includes a measuring hole 2646 defined at one of the side surfaces 2643. In the illustrated embodiment, the measuring hole 2646 and the entrance hole 2644 are defined at the same side surface 2643. The measuring hole 2646 is configured for receiving a thermometer (not shown). The thermometer measures a temperature of the first cooling mold 262, so as to obtain an indication of a temperature of the workpiece unit.

In alternative embodiments, the cooling board 263 can be integrated with the securing board 264 as a single piece. The recess 2633 of the first cooler 26 can be omitted. In such case, the exit hole 2635 of the cooling portion 2632 can directly communicate with at least one of the grooves 2636. The entrance hole 2644 of the securing board 264 can be defined at the upper surface 2642, with the entrance hole 2644 running through the securing board 264.

The second cooler 27 is substantially the same as the first cooler 26. The second cooler 27 is disposed on the support platform 221 of the frame 22. The second cooler 27 includes a third driving mechanism 271, and a second cooling mold 272 disposed at a bottom end of the third driving mechanism 271 beneath the support platform 221. The third driving mechanism 271 is configured for driving the second cooling mold 272 to move down and up. The second cooling mold 272 includes a cooling board 273 and a securing board 274. The securing board 274 secures the cooling board 273 to the third driving mechanism 271.

The controller 28 is configured for driving the worktable 23 to rotate. The controller 28 is also configured for driving the first driving mechanism 251 of the heater 25, the second driving mechanism 261 of the first cooler 26, and the third driving mechanism 271 of the second cooler 27 to move down toward the carriers 24 and up away from the carriers 24. The controller 28 includes a display portion 281. The display portion 281 is configured for displaying and setting various parameters; for example, a rotating speed of the worktable 23, a distance of movement of the first driving mechanism 251, a distance of movement of the second driving mechanism 261, a distance of movement of the third driving mechanism 271, etc.

The hot-melting machine 20 also includes a gas-compressor (not shown). The gas-compressor is configured for providing gas to the first cooler 26 and the second cooler 27.

The hot-melting machine 20 further includes a plurality of sensors (not shown). The sensors are disposed on the heater 25, the first cooler 26, and the second cooler 27 respectively. Each sensor is configured for detecting the presence of a workpiece unit on a corresponding one of the carriers 24, and signaling the controller 28 accordingly.

The hot-melting machine 20 still further includes a pair of transparent protection plates 29. The protection plates 29 are disposed in two sides of the frame 21 adjacent to the heater 25, and are configured for separating the heater 25 from the outside environment. The protection plate 29 at one of the sides of the frame 21 defines an opening 291. At any one time, one of the carriers 24 on the worktable 23 can protrude through the opening 291. This enables convenient loading and unloading of a workpiece unit onto or from that carrier 24.

When the first carrier protrudes through the opening 291, the second carrier is aligned with the second cooler 27, the third carrier is aligned with the first cooler 26, and the fourth carrier is aligned with the heater 25.

Figure 5:
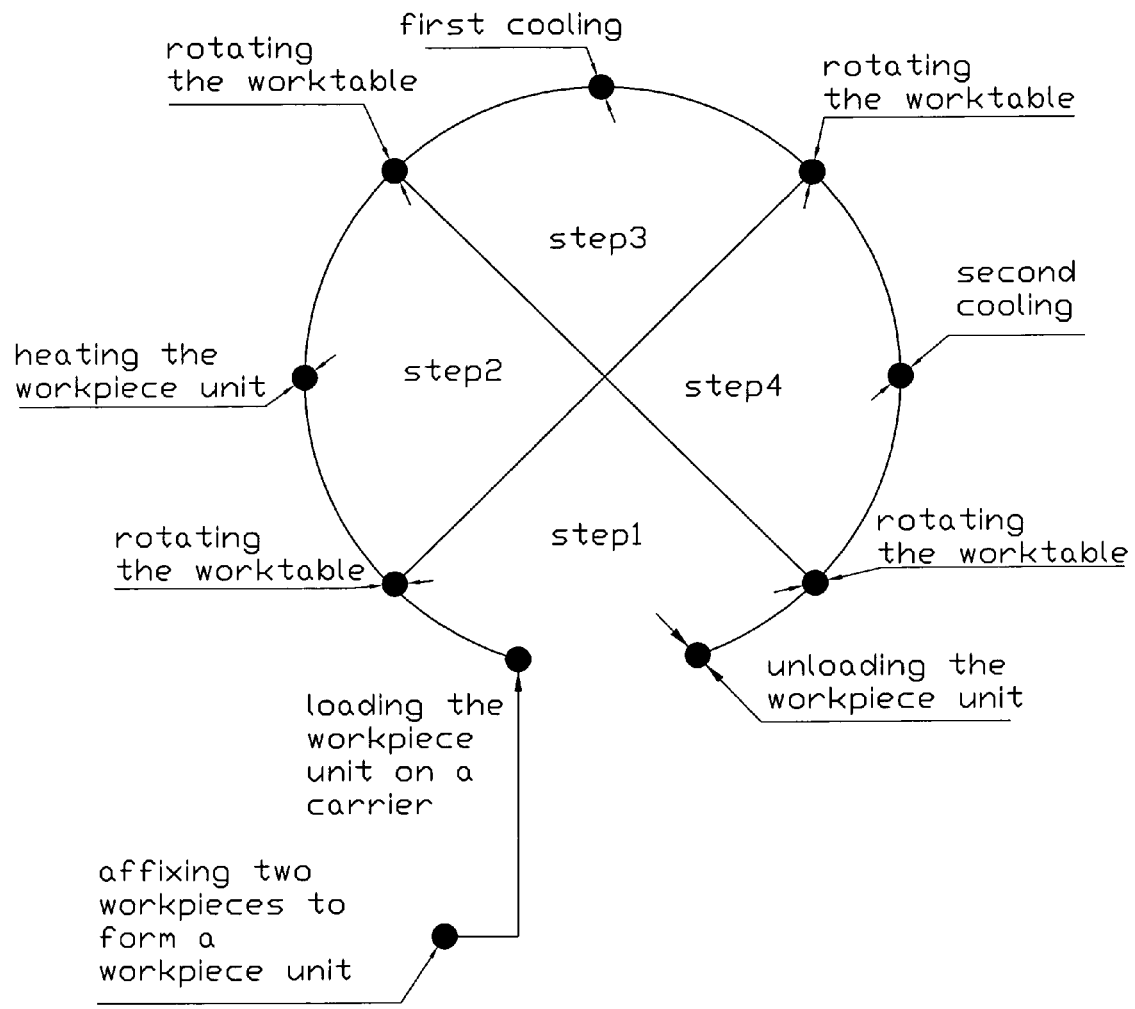
FIG. 5 is a flow chart of use of the hot-melting machine of FIG. 1.
Figure 6:
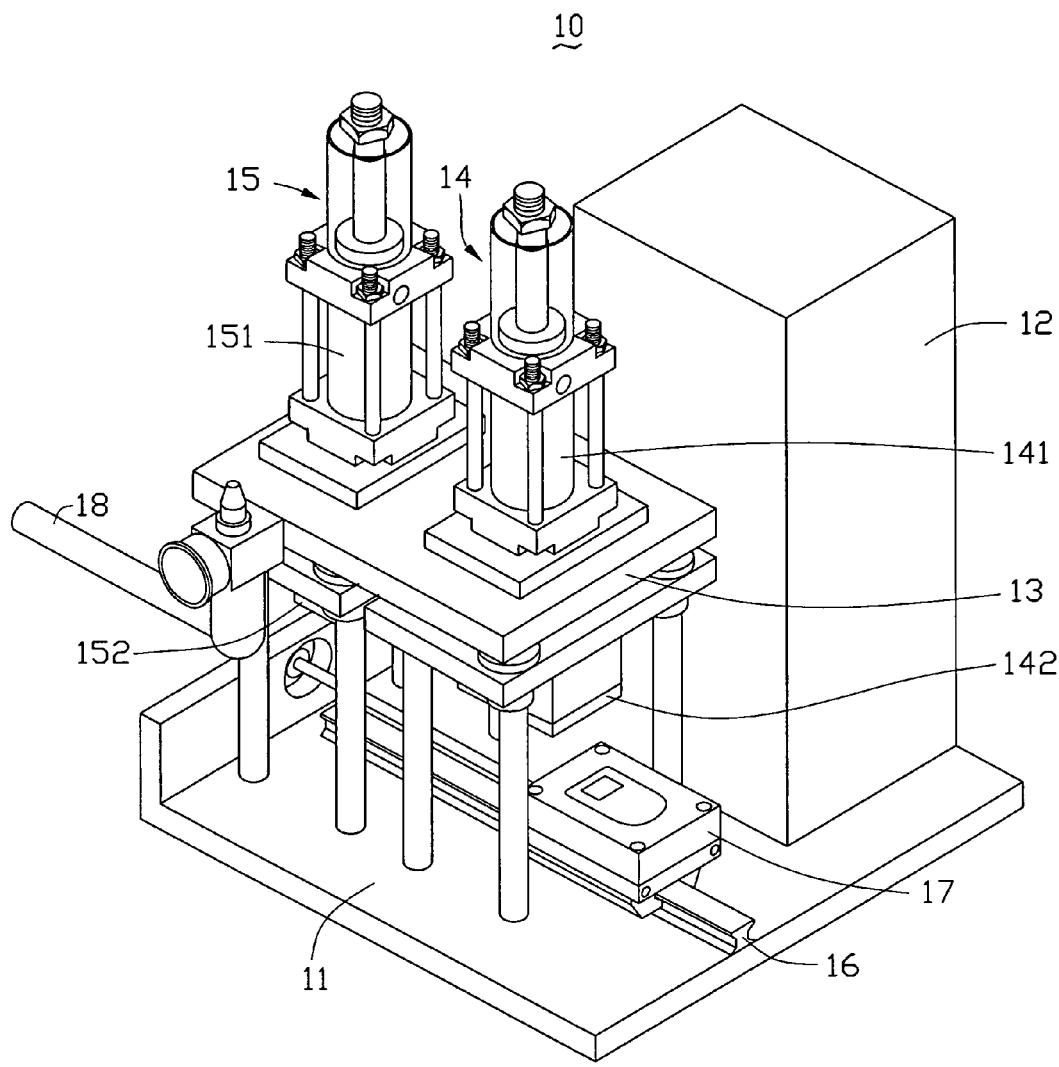
FIG. 6 is an isometric view of a conventional hot-melting machine.
Figure 7:
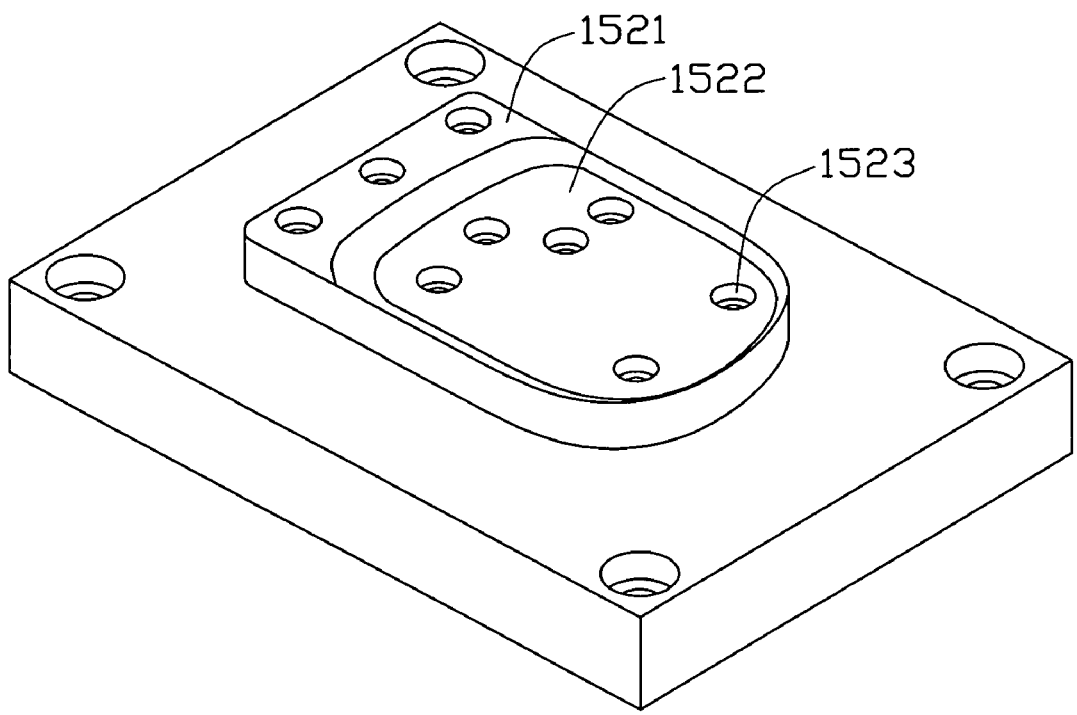
FIG. 7 is an enlarged, inverted isometric view of a cooling mold of a cooler of the hot-melting machine of FIG. 6.
Figure 8:
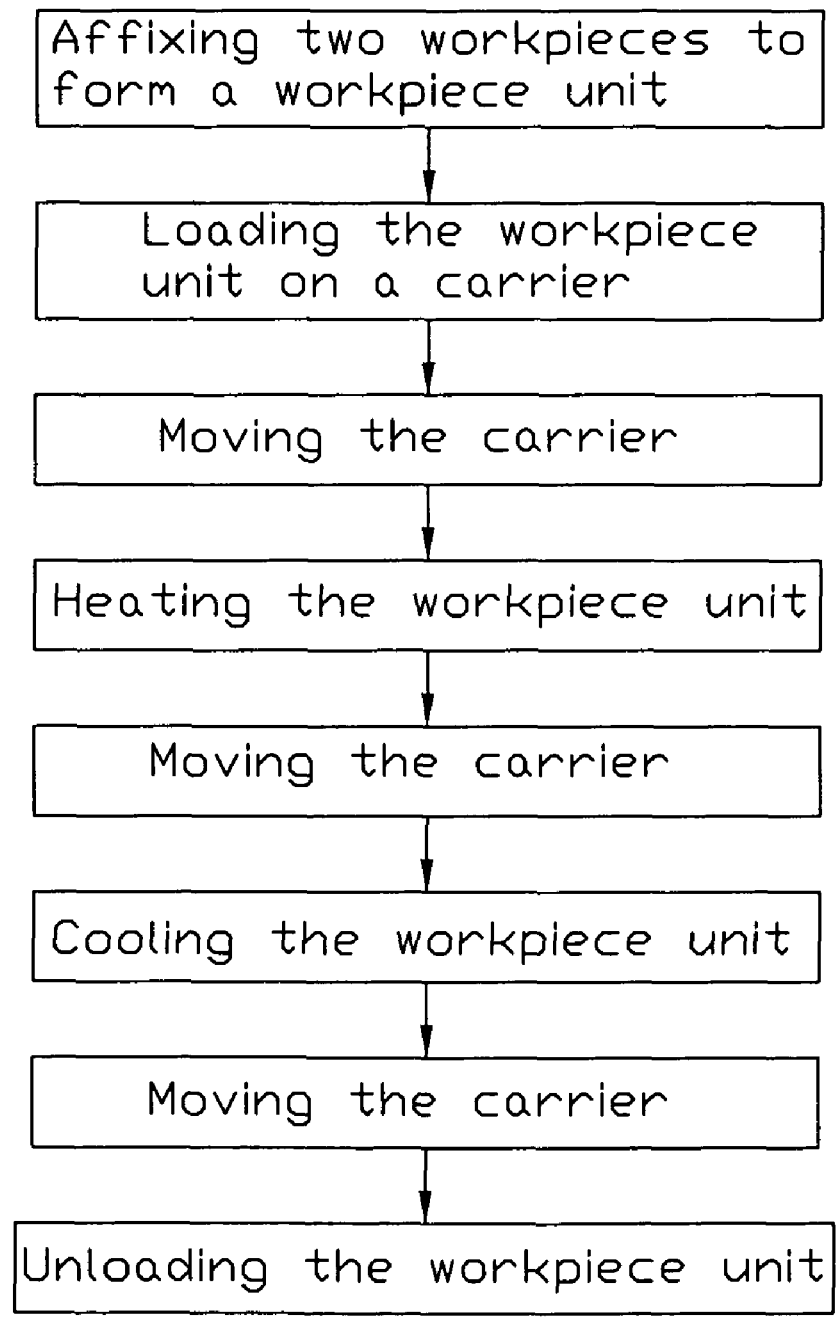
FIG. 8 is a flow chart of use of the hot-melting machine of FIG. 6.

Referring also to FIG. 5, in use of the hot-melting machine 20, in a starting position the first carrier protrudes through the opening 291. Two workpieces are affixed to each other by a hot-melting adhesive to form a first workpiece unit. The first workpiece unit is loaded on the first carrier. The worktable 23 rotates clockwise until the first workpiece unit on the first carrier aligns with the heater 25. The sensor on the heater 25 detects the presence of the first workpiece unit on the first carrier, and signals the controller 28 accordingly. The controller 28 drives the first driving mechanism 251 to move toward the first workpiece unit. The first driving mechanism 251 drives the heating board 252 to move down toward the first workpiece unit until the heating portion 254 abuts against the first workpiece unit for heating. Once the first workpiece unit is aligned with the heater 25, the second carrier protrudes through the opening 291. A second workpiece unit formed by two workpieces is loaded on the second carrier.

When a heating process for the first workpiece unit is finished, the first driving mechanism 251 drives the heating board 252 to move up and separate from the first workpiece unit and return to its original position. At this time, the worktable 23 rotates clockwise until the first workpiece unit on the first carrier aligns with the first cooler 26, and the second workpiece unit on the second carrier aligns with the heater 25. The sensor on the first cooler 26 detects the presence of the first workpiece unit on the first carrier, and the sensor on the heater 25 detects the presence of the second workpiece unit on the second carrier. The sensors then signal the controller 28 accordingly. The controller 28 drives the first driving mechanism 251 to move toward the second workpiece unit. The first driving mechanism 251 drives the heating board 252 to move down toward the second workpiece unit until the heating portion 254 abuts against the second workpiece unit for heating. At the same time, the controller 28 drives the second driving mechanism 261 to move toward the first workpiece unit. The second driving mechanism 261 drives the cooling board 263 to move down toward the first workpiece unit until the cooling portion 2632 abuts against the first workpiece unit for cooling. Gas provided by the gas-compressor is injected into the first cooling mold 262 via the input channel and the grooves 2636 to cool the first workpiece unit. When the first workpiece unit is aligned with the first cooler 26 and the second workpiece unit is aligned with the heater 25, the third carrier protrudes through the opening 291. A third workpiece unit formed by two workpieces is loaded on the third carrier.

When a heating process for the second workpiece unit is finished, the first driving mechanism 251 drives the heating board 252 to move up and separate from the second workpiece unit and return to its original position. When a cooling process for the first workpiece unit is finished, the second driving mechanism 261 drives the cooling board 263 to move up and return to its original position. At this time, the worktable 23 rotates clockwise until the first workpiece unit aligns with the second cooler 27, the second workpiece unit aligns with the first cooler 26, and the third workpiece unit aligns with the heater 25. The corresponding sensors detect the presence of the first workpiece unit, the second workpiece unit, and the third workpiece unit on the first carrier, the second carrier, and the third carrier respectively. The sensors then signal the controller 28 accordingly. The controller 28 drives the first driving mechanism 251 to move toward the third workpiece unit. The first driving mechanism 251 drives the heating board 252 to move down toward the third workpiece unit until the heating portion 254 abuts against the third workpiece unit for heating. At the same time, the controller 28 drives the second driving mechanism 261 to move toward the second workpiece unit. The second driving mechanism 261 drives the cooling board 263 to move down toward the second workpiece unit until the cooling portion 2632 abuts against the second workpiece unit for cooling. The controller 28 drives the third driving mechanism 271 to move toward the first workpiece unit. The third driving mechanism 271 drives the cooling board 273 to move down toward the first workpiece unit until the cooling board 273 abuts against the first workpiece unit for cooling. When the first workpiece unit is aligned with the second cooler 27, the second workpiece unit is aligned with the first cooler 26, and the third workpiece unit is aligned with the heater 25, the fourth carrier protrudes through the opening 291. A fourth workpiece unit formed by two workpieces is loaded on the fourth carrier.

When a heating process for the third workpiece unit is finished, the first driving mechanism 251 drives the heating board 252 to move up and separate from the third workpiece unit and return to its original position. When a cooling process for the second workpiece unit is finished, the second driving mechanism 261 drives the cooling board 263 to move up and return to its original position. When a cooling process for the first workpiece unit is finished, the third driving mechanism 271 drives the cooling board 273 to move up and return to its original position. The worktable 23 rotates clockwise until the second workpiece unit aligns with the second cooler 27, the third workpiece unit aligns with the first cooler 26, the fourth workpiece unit aligns with the heater 25, and the first workpiece unit protrudes through the opening 291. The first workpiece unit is unloaded from the first carrier. Another workpiece unit formed by two workpieces is loaded on the first carrier, and a next cycle of operation of the hot-melting machine 20 begins.

In the hot-melting machine 20, the worktable 23 rotates according to the above-described cyclical operation. At each stage, the four carriers 24 respectively correspond to a loading/unloading step, a heating step, a first cooling step, and a second cooling step. The four steps run simultaneously, whereby operation of the hot-melting machine 20 is efficient.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A hot-melting machine, comprising:
a worktable;
a plurality of carriers located on the worktable and being uniformly spaced apart, each carrier configured for holding a workpiece;

a heater configured for heating the workpiece;
at least one cooler configured for cooling the workpiece, the at least one cooler comprising a driving mechanism and a cooling mold disposed at a bottom end of the driving mechanism, the driving mechanism configured to drive the cooling mold to move down and up, and the cooling mold configured to cool the workpiece and comprising a cooling board and a securing board connecting the cooling board to the driving mechanism, the cooling board defining an exit hole running therethrough, the securing board defining an entrance hole, and the entrance hole and the exit hole cooperatively forming a channel; and
a controller configured for driving the worktable to rotate, the heater to move down toward and up away from a corresponding one of the carriers, and the at least one cooler to move down toward and up away from another corresponding one of the carriers, wherein at each of successive stages in operation of the hot-melting machine, one of the carriers is aligned with the heater, another one of the carriers is aligned with the at least one cooler, and a further one of the carriers is positioned such that a workpiece can be unloaded from the further one of the carriers and another workpiece can be loaded on the further one of the carriers.

2. The hot-melting machine as claimed in claim 1, wherein the heater comprises a driving mechanism and a heating board disposed at a bottom end of the driving mechanism, the driving mechanism is configured for driving the heating board to move down and up, and the heating board is configured for heating the workpiece.

3. The hot-melting machine as claimed in claim 1, wherein the cooling board comprises a protrusion, and the protrusion defines at least one exit hole and a plurality of intersecting grooves communicating with the exit hole.

4. The hot-melting machine as claimed in claim 1, wherein the cooling board comprises a recess and a plurality of grooves, the recess has a top surface, the exit hole is defined at the top surface, and at least one of the grooves communicates with the recess.

5. The hot-melting machine as claimed in claim 1, wherein the securing board is generally rectangular, and comprises an upper surface, a lower surface opposite to the upper surface, and four side surfaces connecting the upper surface and the lower surface, and the lower surface is adjacent to the cooling board.

6. The hot-melting machine as claimed in claim 5, wherein the entrance hole is defined at one of the side surfaces of the securing board, and runs through to the lower surface of the securing board.

7. The hot-melting machine as claimed in claim 1, further comprising a frame having a support platform, wherein the heater and the at least one cooler are attached to the support platform.

8. The hot-melting machine as claimed in claim 7, further comprising a protection plate, wherein the protection plate is disposed in a side of the frame adjacent to the heater, the protection plate defines an opening, and at each of the successive stages in operation of the hot-melting machine the further one of the carriers protrudes through the opening.

9. The hot-melting machine as claimed in claim 1, wherein the controller comprises a display device.

10. A hot-melting machine, comprising:
a worktable;
a plurality of carriers located on the worktable and being uniformly spaced apart, each carrier configured for holding a workpiece;
a heater configured for heating the workpiece;
at least one cooler configured for cooling the workpiece, the at least one cooler comprising a driving mechanism and a cooling mold disposed at a bottom end of the driving mechanism, the driving mechanism configured to drive the cooling mold to move down and up, and the cooling mold configured to cool the workpiece and comprising a cooling board and a securing board connecting the cooling board to the driving mechanism, the cooling board comprising a protrusion, and the protrusion defining at least one exit hole and a plurality of intersecting grooves communicating with the exit hole; and
a controller configured for driving the worktable to rotate, the heater to move down toward and up away from a corresponding one of the carriers, and the at least one cooler to move down toward and up away from another corresponding one of the carriers, wherein at each of successive stages in operation of the hot-melting machine, a first carrier of the carriers is aligned with the heater, a second carrier of the carriers is aligned with the at least one cooler, and a third carrier of the carriers is positioned such that a workpiece can be unloaded from the third carrier and another workpiece can be loaded on the third carrier.

11. The hot-melting machine as claimed in claim 10, wherein the cooling board defines an exit hole running therethrough, the securing board defines an entrance hole, and the entrance hole and the exit hole cooperatively form a channel.

12. The hot-melting machine as claimed in claim 11, wherein the cooling board comprises a recess and a plurality of grooves, the recess having a top surface, the exit hole being defined at the top surface, and at least one of the grooves communicating with the recess.

13. The hot-melting machine as claimed in claim 11, wherein the securing board is generally rectangular, and comprises an upper surface, a lower surface opposite to the upper surface, and four side surfaces connecting the upper surface and the lower surface, and the lower surface is adjacent to the cooling board.

14. The hot-melting machine as claimed in claim 13, wherein the entrance hole is defined at one of the side surfaces of the securing board, and runs through to the lower surface of the securing board.

* * * * *